United States Patent
Okuyama

(10) Patent No.: US 7,327,939 B2
(45) Date of Patent: Feb. 5, 2008

(54) FORMAT CONVERSION METHOD AND APPARATUS AND FORMAT CONVERSION CONTROL PROGRAM

(75) Inventor: Tomoyuki Okuyama, Kanagawa (JP)

(73) Assignee: NEC Electronics Corporation, Kanagawa (JP)

(*) Notice: Subject to any disclaimer, the term of this patent is extended or adjusted under 35 U.S.C. 154(b) by 127 days.

(21) Appl. No.: 11/114,194

(22) Filed: Apr. 26, 2005

(65) Prior Publication Data

US 2005/0244149 A1 Nov. 3, 2005

(30) Foreign Application Priority Data

Apr. 30, 2004 (JP) .............................. 2004-136153

(51) Int. Cl.
*H04N 5/91* (2006.01)
*H04N 7/00* (2006.01)

(52) U.S. Cl. ........................................ 386/95; 386/131

(58) Field of Classification Search .................... None
See application file for complete search history.

(56) References Cited

U.S. PATENT DOCUMENTS

2003/0091342 A1* 5/2003 Shibutani et al. ............ 386/131
2003/0138239 A1* 7/2003 Itoi .............................. 386/95
2003/0152372 A1* 8/2003 Shimizu et al. .............. 386/131

FOREIGN PATENT DOCUMENTS

JP 2003-085877 A 3/2003

* cited by examiner

*Primary Examiner*—Thai Q. Tran
*Assistant Examiner*—Anner Holder
(74) *Attorney, Agent, or Firm*—Foley & Lardner LLP

(57) ABSTRACT

In the starting NV_PCK of a VOBU in a DVD-Video format stream, a flag indicating the M value preceding and succeeding the VOBU is inserted to indicate the picture structure of the VOBUs before and after a cell boundary for use in calculating time information on a DVD-VR format stream from time information on a DVD-Video format stream.

29 Claims, 14 Drawing Sheets

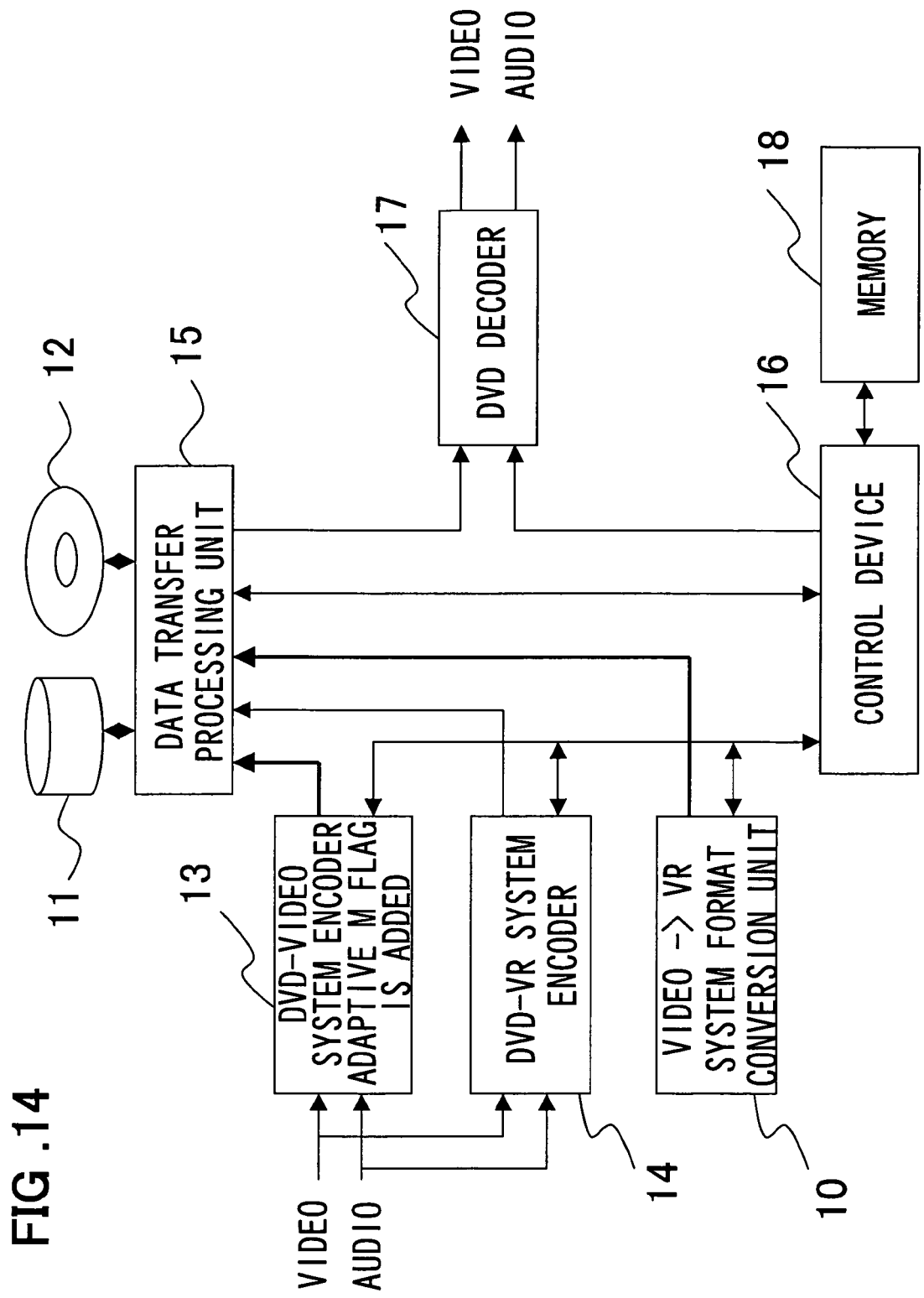

FORMAT CONVERSION METHOD AND APPARATUS AND FORMAT CONVERSION CONTROL PROGRAM

FIELD OF THE INVENTION

The present invention relates to a format conversion technology for converting information recorded on an information recording medium, and more particularly to a format conversion method and device and a conversion control program advantageously applicable to a data recording device and a dubbing device that record data based on the DVD (Digital Versatile Disc)-Video standard and the DVD-Video Recording (DVD-VR) standard.

BACKGROUND OF THE INVENTION

A recent advance in the digital technology has made popular large-capacity discs, such as a DVD and a HDD (hard disk drive), with video data and audio data compressed and recorded on those disk media. In general, data is recorded on a HDD, a DVD-RAM, and a DVD-RW in the DVD-VR standard format. Data is recorded on a DVD-R and a DVD-RW in the DVD-Video standard format with emphasis on the compatibility with the conventional DVD players.

To dub data from disk to disk in a recorder containing different disc drives at the same time, it is required to speedily perform format conversion between DVD formats.

FIG. 1 is a diagram showing the configuration of a DVD-Video format stream (stream 100, cell 101, video object unit (called "VOBU") 102) and a DVD-VR stream 103.

As shown in the stream 100 in FIG. 1, a DVD-Video format stream includes a plurality of cells each including a plurality of VOBUs.

The VOBU 102 comprises one navigation pack (called "NV_PCK") provided at the start and containing playback control information; video packs (called "V_PCK") in which video elementary data is stored and audio packs (called "A_PCK") in which audio elementary data is stored.

In a DVD-Video format stream, the time information in the stream is reset for each cell. That is, the system clock reference (called "SCR") is reset to zero on a cell boundary.

Next, the DVD-VR format stream will be described. As shown in the DVD-VR stream 103 in FIG. 1, the DVD-VR stream comprises a plurality of VOBUs. There is one real-time data information pack (called "RDI_PCK") and a plurality of V_PCKs and A_PCKs.

The DVD-VR format stream has no cell, and the time information is not reset in one stream. Because the DVD-VR format stream has no cell, the SCR value increases monotonously.

In both the DVD-Video format and the DVD-VR format, each of a V_PCK and an A_PCK includes two types of timestamp: one is a presentation timestamp ("V_PTS" and "A_PTS" respectively) that is a playback time for playing back video frames and audio frames included in the pack, and the other is a decoding timestamp ("V_DTS" and "A_DTS" respectively) for decoding video frames and audio frames (PTS and DTS are defined by the MPEG standard for playing back video data and audio data synchronously).

Next, the following describes an example of the method for converting a DVD-Video format stream to a DVD-VR format stream (see Patent Document 1 shown below). Patent Document 1 discloses a conversion device that converts a playback-only DVD format (DVD-R) bit stream to a recording DVD format (DVD-RAM) bit stream. FIG. 12 is a diagram showing a conventional method for converting a DVD-Video format stream to a DVD-VR format stream. FIG. 12 is a schematic diagram for describing the conversion technology, described in Patent Document 1, in an easy-to-understand way. In FIG. 12, NV, V, and A in the DVD-Video format stream represent an NV_PCK, a V_PCK, and an A_PCK, respectively. In the elementary data shown in FIG. 12, I represents an I picture (intra-frame coded screen) defined by the MPEG standard, P represents a P picture (inter-frame coded screen), and B represents a B picture (inter-frame coded screen configured using bi-directional predictions from preceding and following I or P pictures), respectively. An AAU is an MPEG audio access unit. In FIG. 12, RD, V, and A in the converted DVD-VR format stream represent an RDI_PCK, a V_PVK, and an A_PCK, respectively.

As shown in FIG. 12, the video elementary data and the audio elementary data in a V_PCK and an A_PCK in the DVD-Video format stream are analyzed to obtain information on the picture structure of the video elementary data and the number of access units of the audio elementary data (see the picture structure analysis and the audio analysis in FIG. 12). From this information, the information to be used in the DVD-VR format stream is calculated, including the system clock reference SCR used as the time information, the presentation timestamp PTS used as the playback time, and the decoding timestamp DTS used as the decoding time. Based on the calculated time information (SCR, PTS, and DTS), the elementary data is extracted from the DVD-Video format stream and the extracted data is re-multiplexed into a DVD-VR format stream.

[Patent Publication 1]

Japanese Patent Kokai Publication No. JP-P2003-85877A (FIG. 1)

An I picture and a P picture defined by the MPEG video standard are called core pictures, and the interval between those pictures is called an M value. According to the MPEG video standard, the M value can vary arbitrarily.

In a DVD-Video format stream where the M value varies arbitrarily, the time information calculation on a cell boundary is complex and takes long.

To calculate the time information on a cell boundary, it is necessary to obtain the picture type information in the VOBUs before and after the cell boundary from the video elementary data and to calculate the time information in the DVD-VR format stream that increases monotonously.

Because a V_PCK and an A_PCK can include a plurality of picture frames and audio frames respectively, simply obtaining the V_PTS and V_DTS values from the V_PCK and the A_PTS values from the A_PCK is not enough for calculating the time information. The video and audio elementary data must at least be analyzed at conversion time (for example, coding amount and the number of frames), and the problem is that this requires time for search processing and read processing.

In addition, to extract elementary data from a DVD-Video format stream and to multiplex the extracted data into a DVD-VR format stream, it is necessary to perform calculation considering the limit on the buffers of the DVD-specific video and audio data and then to re-multiplex the video and audio elementary data. This takes a long time.

SUMMARY OF THE DISCLOSURE

The reducing processing amount required at least when a playback-only DVD (DVD-Video format) bit stream to a recording DVD (DVD-VR format) bit stream is demanded.

A method according to one aspect of the present invention is a format conversion method for converting a first DVD format stream, which includes a plurality of cells each including a plurality of video object units (VOBU) and is used primarily for playback, to a second DVD format stream which has no cell structure and is used for recording. The format conversion method comprises a first step of inserting a flag into a starting pack of a VOBU in the first DVD format stream, the flag indicating a status of a picture structure of a predetermined number of pictures preceding and succeeding the pack; and a second step of obtaining the picture structure of a VOBU, which precedes and succeeds a cell boundary, from the flag information included in the first DVD format stream for calculating time information on the second DVD format stream from time information on the first DVD format stream.

A method according to another aspect of the present invention inserts a flag (called an "adaptive M flag"), which indicates an M value (an interval between core pictures) preceding and succeeding the VOBU, into a starting NV_PCK in a VOBU in a DVD-Video format stream; and obtains a picture structure of VOBUs preceding and succeeding a cell boundary for calculating time information on a DVD-VR format stream from time information on the DVD-Video format stream.

A method according to another aspect of the present invention comprises the steps of:

inserting a flag, which is used for determining an M value (Mp, Ms) that is an interval between core pictures preceding and succeeding a video object unit (VOBU), into a navigation pack (NV_PCK) of the VOBU in a DVD-Video format stream;

reading the DVD-Video format stream, which contains the navigation pack in which the flag is inserted, from a storage unit, detecting a playback start time (VOBU_S_PTM) in each pack of the DVD-Video format stream, a presentation timestamp (V_PTS) of a video pack, and a decoding timestamp (V_DTS) of the video pack according to the M value (Mp, Ms) preceding and succeeding the VOBU included in the flag in the starting navigation pack (NV_PCK) of the VOBU included in the DVD-Video, and finding a playback start time (VOBU_S_PTM) of a next VOBU, V_PTS and V_DTS offset values on a VOB boundary, and base values α and β of a V_PTS and a V_DTS after the VOB boundary; and calculating new V_PTS and V_DTS values for a DVD-VR format stream based on the V_PTS and V_DTS, the V_PTS and V_DTS offset values on a VOB boundary, and the base values α and β of a V_PTS and a V_DTS after the VOB boundary and recording the calculated values as information on the DVD-VR format stream.

An apparatus according to another aspect of the present invention is a format conversion apparatus for converting a DVD playback format stream, which includes a plurality of cells each including a plurality of video object units (VOBU), to a recording format stream which has no cell structure. The format conversion apparatus comprises an encoder circuit that inserts a flag, which indicates a status of a picture structure of a predetermined number of pictures preceding and succeeding the pack, into a starting pack of a VOBU in the playback format stream and stores the playback format stream, in which the flag is inserted, into a storage unit; and a conversion circuit that reads the playback DVD format stream from the storage unit, obtains a picture structure of VOBUs preceding and succeeding a cell boundary from the flag, and calculates time information on the playback/recording DVD format stream from time information on the playback DVD format stream.

An apparatus according to another aspect of the present invention comprises means for inserting a flag, which indicates an M value preceding and succeeding a VOBU, into a starting NV_PCK in the VOBU in a DVD-Video format stream; and means for obtaining the picture structure of VOBUs preceding and succeeding a cell boundary in the DVD-Video format stream and for calculating time information on a DVD-VR format stream from time information on the DVD-Video format stream.

A computer program according to another aspect of the present invention comprises a program that causes a computer, which constitutes a device for converting a DVD-Video format stream to a DVD-VR format stream for dubbing, to determine the picture structure of VOBUs preceding and succeeding a cell boundary in the DVD-Video format stream, which has a flag inserted into each starting NV_PCK to indicate the M value preceding and succeeding the VOBU, and to calculate time information on the DVD-VR format stream to time information on the DVD-Video format stream.

The meritorious effects of the present invention are summarized as follows.

The method, device, and program according to the present invention obtain the picture structure of a VOBU preceding and succeeding a cell boundary, calculate time information on a DVD-VR format stream from time information on a DVD-Video format stream, and sequentially convert the DVD-Video format stream to the DVD-VR format stream beginning with the start, one pack at a time, without analyzing video and audio elementary data, thus reducing the processing time. Still Other effects and advantages of the present invention will become readily apparent to those skilled in this art from the following detailed description in conjunction with the accompanying drawings wherein only the preferred embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 14 is a diagram showing the configuration of a format conversion dubbing device in the embodiment of the present invention.

PREFERRED EMBODIMENTS OF THE INVENTION

Figure 2:
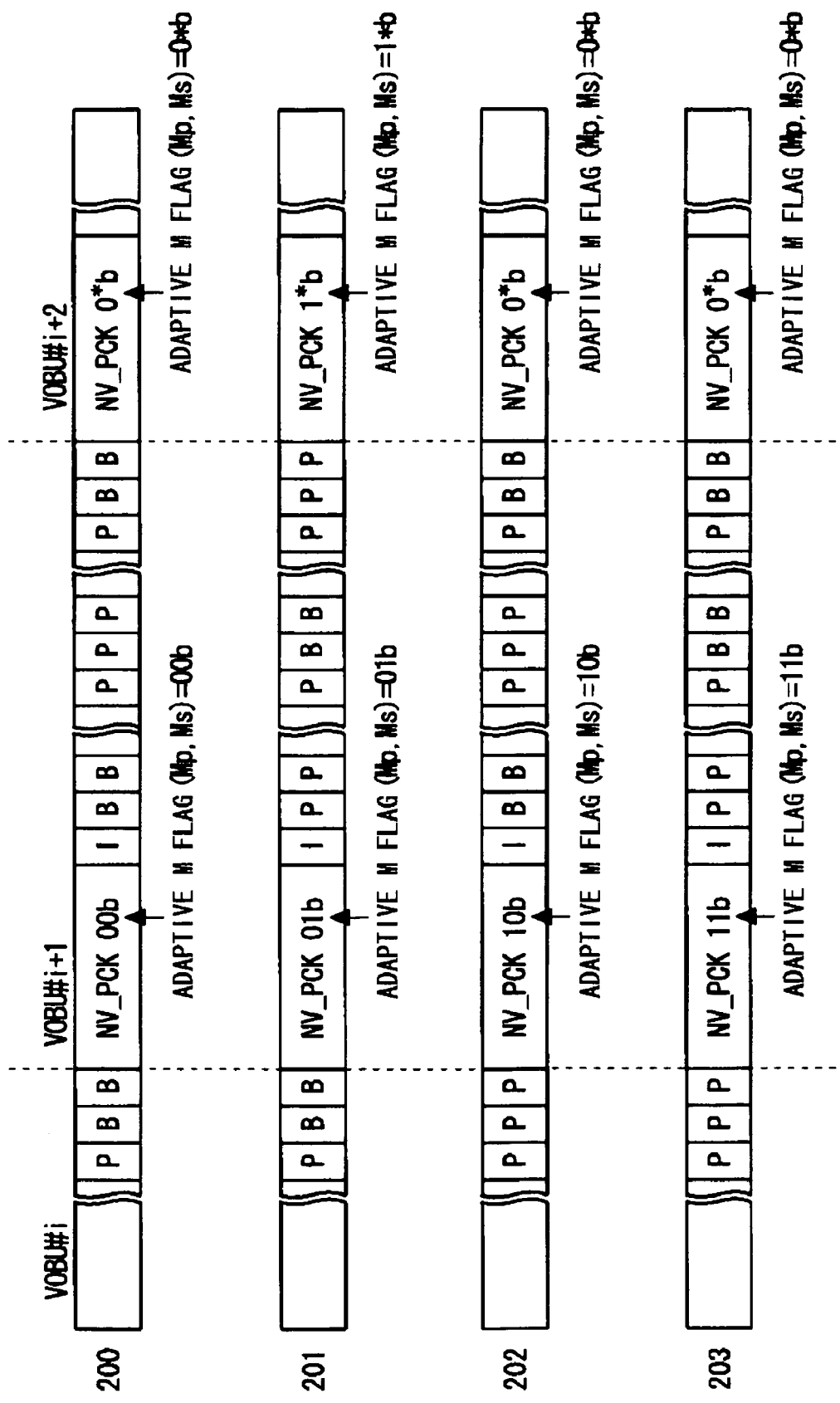
FIG. 2 is a diagram showing the configuration of data streams for describing the present invention.

An embodiment of the present invention will be described. FIG. 2 is a diagram showing one embodiment of the present invention. In one embodiment of the present invention, a flag (called "adaptive M value flag" in this specification) indicating the M value (interval between core pictures) preceding and succeeding a VOBU in a DVD-Video format stream is inserted into the starting NV_PCK of the VOBU as shown by the numerals 200-203 in FIG. 2. This flag indicates the picture structure of the VOBUs preceding and succeeding a cell boundary to allow the time information in the DVD-VR format stream to be calculated from the time information in the DVD-Video format stream.

In the present embodiment, the time information that is calculated as described above allows a DVD-Video format stream to be converted to a DVD-VR format stream sequentially, one pack at a time, from the start of the DVD-Video format stream without analyzing the video elementary data and audio elementary data. This method reduces the processing time.

When data is encoded in one embodiment of the present invention, an adaptive M flag (Mp, Ms), which indicates the picture structure of M pictures preceding and succeeding an NV_PCK, is inserted into the NV_PCK of each VOBU in a DVD-Video format stream as shown in FIG. 2.

FIG. 2 shows the variation between M=3 and M=1. In this case, (Mp, Ms)=00b, 01b, 10b, and 11b correspond to M=0, 1, 2, and 3. Mp is a value preceding in time, and Ms is a value succeeding in time. The numerals 200-203 in FIG. 2 indicate the status of the adaptive M flag for the picture structure pattern composing of three pictures preceding and succeeding a VOBU. In FIG. 2, the numeral 200 indicates the adaptive M flag (Mp, Ms)=00b, the numeral 201 indicates the adaptive M flag (Mp, Ms)=01b, the numeral 202 indicates the adaptive M flag (Mp, Ms)=10b, and the numeral 203 indicates the adaptive M flag (Mp, Ms)=11b.

In the present embodiment, the format conversion apparatus reads the DVD-Video format stream and sequentially processes the packs starting at the first pack, one pack at a time.

Figure 1:
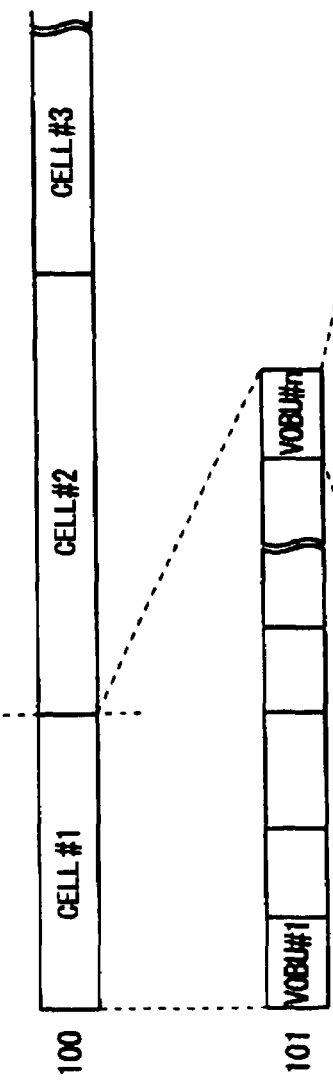
FIG. 1 is a diagram showing the configuration of data streams for describing the present invention.
Figure 1:
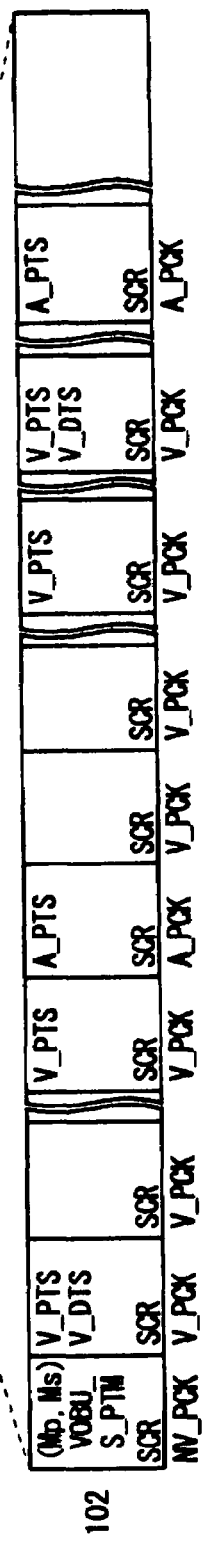
Figure 1:
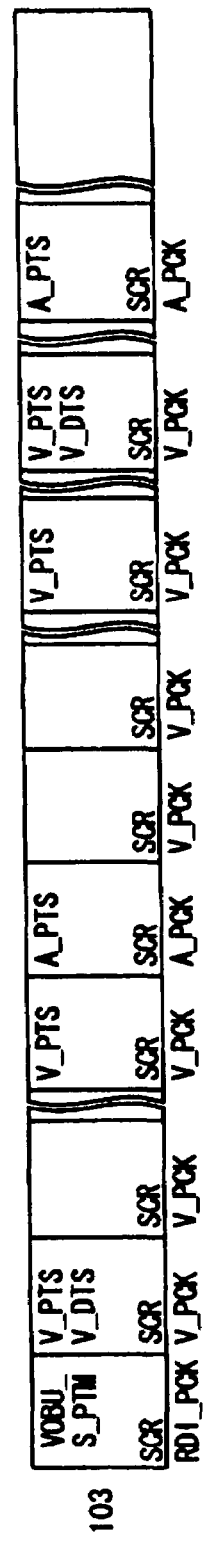

In the DVD-Video format stream in FIG. 1, there is a boundary of cells each of which includes an arbitrary number of VOBUs (as indicated by the numerals 100 and 101) and, across the boundary, the time information included in the stream indicated by the numeral 102 is discontinuous.

On the other hand, the time information in the DVD-VR format stream 103 increases monotonously.

When the format of a DVD-Video format stream is converted to that of a DVD-VR format stream, the time information immediately after a cell boundary in the DVD-Video format stream is calculated and the calculated time information is rewritten in the DVD-VR format stream.

There are following types of time information: system clock reference (SCR) stored in all packs, VOBU playback start time VOBU_S_PTM stored in an RDI_PCK, V_PTS and V_DTS stored in a V_PCK, and A_PTS stored in an A_PCK.

Figure 3:
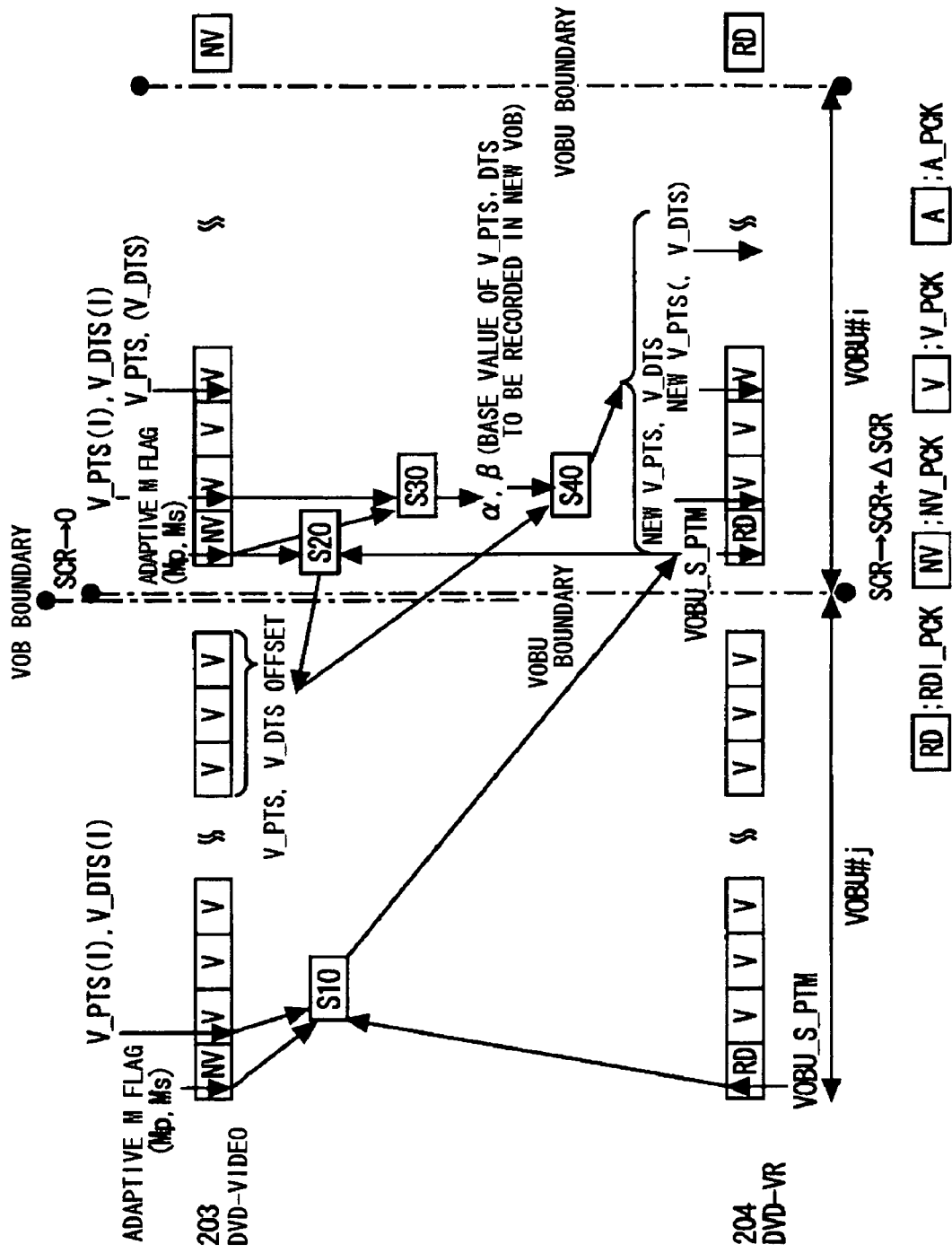
FIG. 3 is a diagram showing the control operation of an embodiment of the present invention.

FIG. 3 shows the relation between the time, at which time information (SCR, V_PTS, V_DTS, and VOBU_S_PTM) is calculated, and each value calculation when a DVD-Video format stream is converted serially to a DVD-VR format stream, one pack at a time. The calculation expressions are described below.

S10 in FIG. 3 indicates processing in which the next VOBU_S_PTM is calculated. The VOBU_S_PTM of the next VOBU#i is calculated from the VOBU_S_PTM of the RDI_PCK of VOBU#j of a DVD-VR 204, the adaptive flag (Mp, Ms) of a DVD-Video 203, and the V_PTS and V_DTS of the V_PCK according to the expressions (1) and (2) given below.

$$VOBU\_S\_PTM = V\_PTS(I2) + \Delta PTS \times (N \text{ value} - 2) \text{ [if } Ms=0\text{]} \quad (2)$$

$$VOBU\_S\_PTM = V\_PTS(I0) + \Delta PTS \times N \text{ value [if } Ms=1\text{]} \quad (2)$$

That is, in case of Ms=0, the starting pictures of the VOBU are I2, B0, and B1 in this order. Those pictures are played back in order of B0, B1, and I2. The VOBU_S_PTM is the playback start time of the VOBU, and the VOBU_S_PTM value at the playback start time of the next VOBU#i is calculated from the PTS increment value for the number of pictures, which is calculated by subtracting two pictures (B0 and B1) from the N value of the current VOBU (that is, the number of pictures), and the PTS value of I2. In case of Ms=1, the starting pictures of the VOBU are I0, B1, and B2 in this order. Therefore, the VOBU_S_PTM value at the playback start time of the next VOBU#i is calculated from the PTS increment value of the N value (that is, the number of pictures) of the current VOBU and the PTS value of I0.

In the equations (1) and (2), the N value is the number of frames in one GOP (Group Of Pictures). ΔPTS is a difference in the presentation timestamps.

S20 in FIG. 3 indicates processing in which the V_PTS and V_DTS offset values on a cell boundary are calculated. In the DVD-Video 203, the SCR is reset to 0 on a VOB (a set of VOBUs) boundary. In processing S20, the V_PTS offset is calculated from the expression (3) given below, and the V_DTS offset from the expressions (4) and (5) given below, by referring to the adaptive flag (Mp, Ms) based on the VOBU_S_PTM value of VOBU#i calculated from the expressions (1) and (2) given above and the V_PTS and V_DTS of the V_PCK.

$$V\_PTS \text{ offset} = VOBU\_S\_PTM - \Delta PTS \quad (3)$$

$$V\_DTS \text{ offset} = V\_PTS \text{ offset value} - \Delta DTS \times 3 \text{ [if } Mp=0\text{]} \quad (4)$$

$$V\_DTS \text{ offset} = V\_PTS \text{ offset value} - \Delta DTS \text{ [if } Mp=1\text{]} \quad (5)$$

In the expression (4) above (Mp=0), the three pictures in the preceding VOBU are P, B, and B. The decoding order is P, B, and B, and the playback order is B, B, and P. The time relation of picture decoding and playback is as follows.

Decode P, B, B, *

Playback B, B, P

Therefore, the offset value can be calculated from the difference between the V_PTS offset and the increment value of the V_DTS×3.

S30 indicates processing. in which the base values α and β of the V_PTS and V_DTS immediately after the cell boundary are calculated.

$$\alpha = V\_PTS(I2) - \Delta PTS \times 3 \text{ [if } Ms=0\text{]} \quad (6)$$

$$\alpha = V\_PTS(I0) - \Delta PTS \text{ [if } Ms=1\text{]} \quad (7)$$

$$\beta = \alpha - \Delta PTS \times 3 \text{ [if } Ms=0\text{]} \quad (8)$$

$$\beta = \alpha - \Delta PTS \text{ [if } Ms=1\text{]} \quad (8)$$

S40 indicates processing in which the new V_PTS and V_DTS that are set in the DVD-VR 204 are calculated. The new V_PTS and V_DTS are calculated by the expressions (10) and (11) given below.

$$\text{New } V\_PTS = V\_PTS - \alpha + V\_PTS \text{ offset} \quad (10)$$

$$\text{New } V\_DTS = V\_DTS - \beta + V\_PTS \text{ offset} \quad (11)$$

As described above, the VOBU_S_PTM, V_PTS, and V_DTS of each pack in a DVD-Video format stream are detected according to the value of the adaptive flag (Mp, Ms) in the NV_PCK of the DVD-Video format stream. At the same time, the VOBU_S_PTM value of the next VOBU, the offset values of the V_PTS and V_DTS on a cell boundary, the base values α and β of the V_PTS and V_DTS immediately after a cell boundary, and the new V_PTS and V_DTS values of the DVD-VR format stream are calculated, and they are written as time information in the DVD-VR format stream.

The detail of the processing flow described above will be described as an example of the present invention with reference to the flowcharts in FIG. 7 and the following figures.

Figure 7:
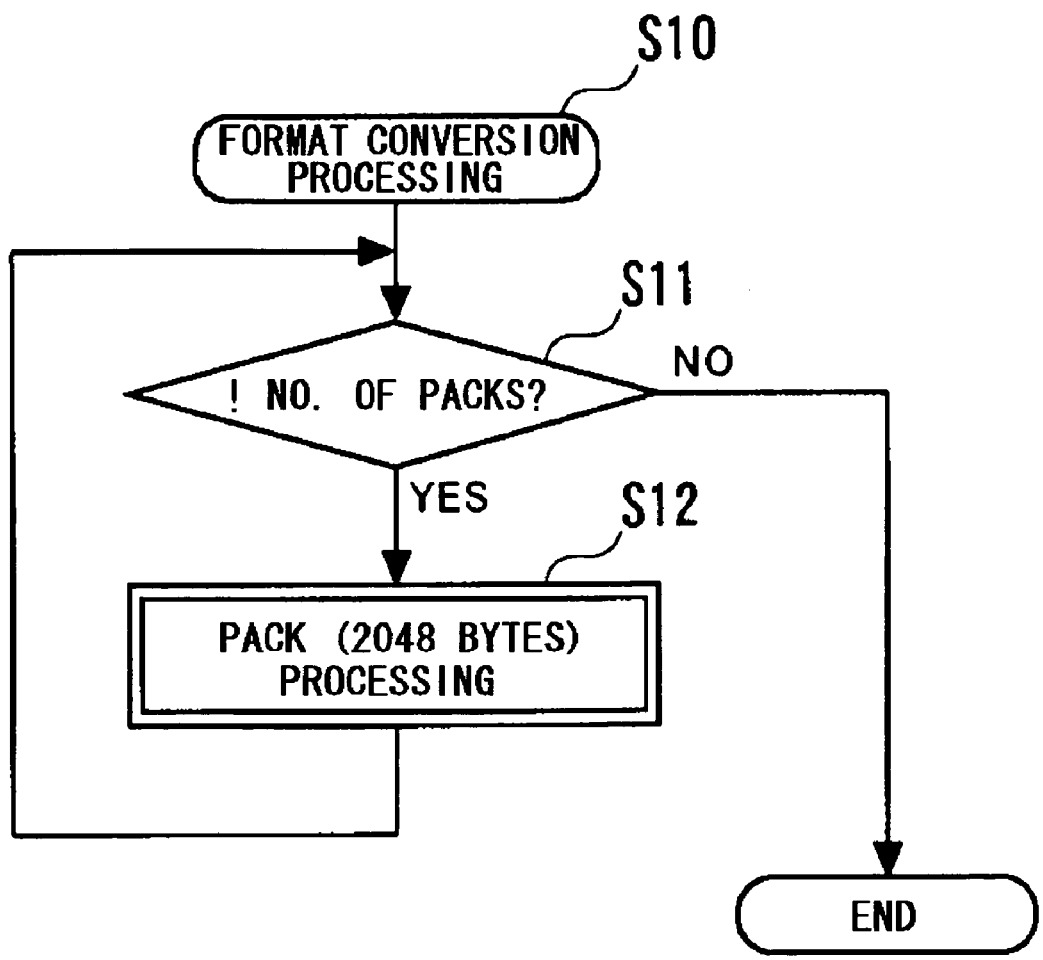
FIG. 7 is a flowchart showing the operation of the embodiment of the present invention.

FIG. 7 is a diagram showing the processing flow of format conversion processing. In step S11, whether the number of packs is 0 is checked (the symbol ! is an operator executing the NOT operation). During format conversion processing, pack processing S12 is repeated for the number of packs. In step S11, if the number of packs (stored in a variable managed during format conversion) is 0, the processing is terminated.

Figure 8:
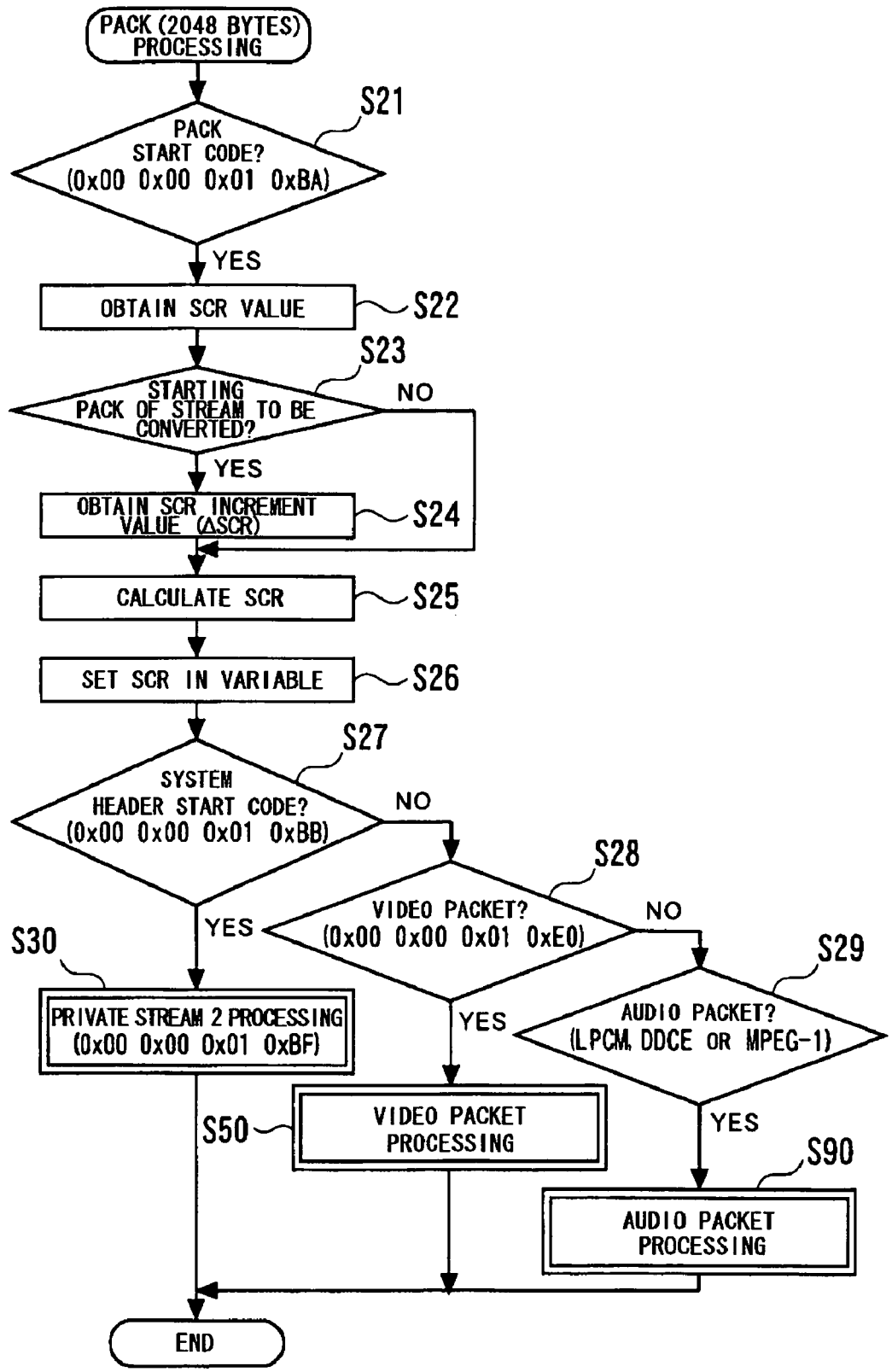
FIG. 8 is a flowchart showing the pack processing in the embodiment of the present invention.

FIG. 8 is a diagram showing the detail of the pack processing S12 in FIG. 7. With reference to FIG. 8, the pack processing will be described.

A check is made if the pack from the DVD-Video contains a pack start code (Pack_Start_Code)(=0x00 0x00 0x01 0xBA) (step S21). If it is found that the pack contains the pack start code (start of a pack), the SCR is obtained from the pack header area that immediately follows the Pack_Start_Code (step S22). Note that a pack begins with the Pack_Start_Code (MPEG standard). If it is found in step S21 that the pack is not the start pack of the stream to be processed, the subsequent processing is not executed.

If it is found in step S23 that the pack is the start pack of the stream to be processed, the increment value ΔSCR of the SCR (difference from the SCR of the preceding pack) is obtained (step S24).

The new SCR is calculated from the SCR obtained in step S22 and ΔSCR obtained in step S24 (step S25), and the calculated SCR is set in a variable (step S26). The calculated SCR, which will be used in subsequent processing, is pre-calculated and held in this example. The SCR is used, for example, in the private stream 2 processing in step S30.

If the system header start code of the pack is detected (YES in step S27), the private stream 2 processing (processing for the NV_PCK in DVD-Video) is executed (step S30).

If the packet is a video packet (YES in step S28), video packet processing is executed (step S50).

If the packet is an audio packet (YES in step S29), audio packet processing is executed (step S90).

Figure 9:
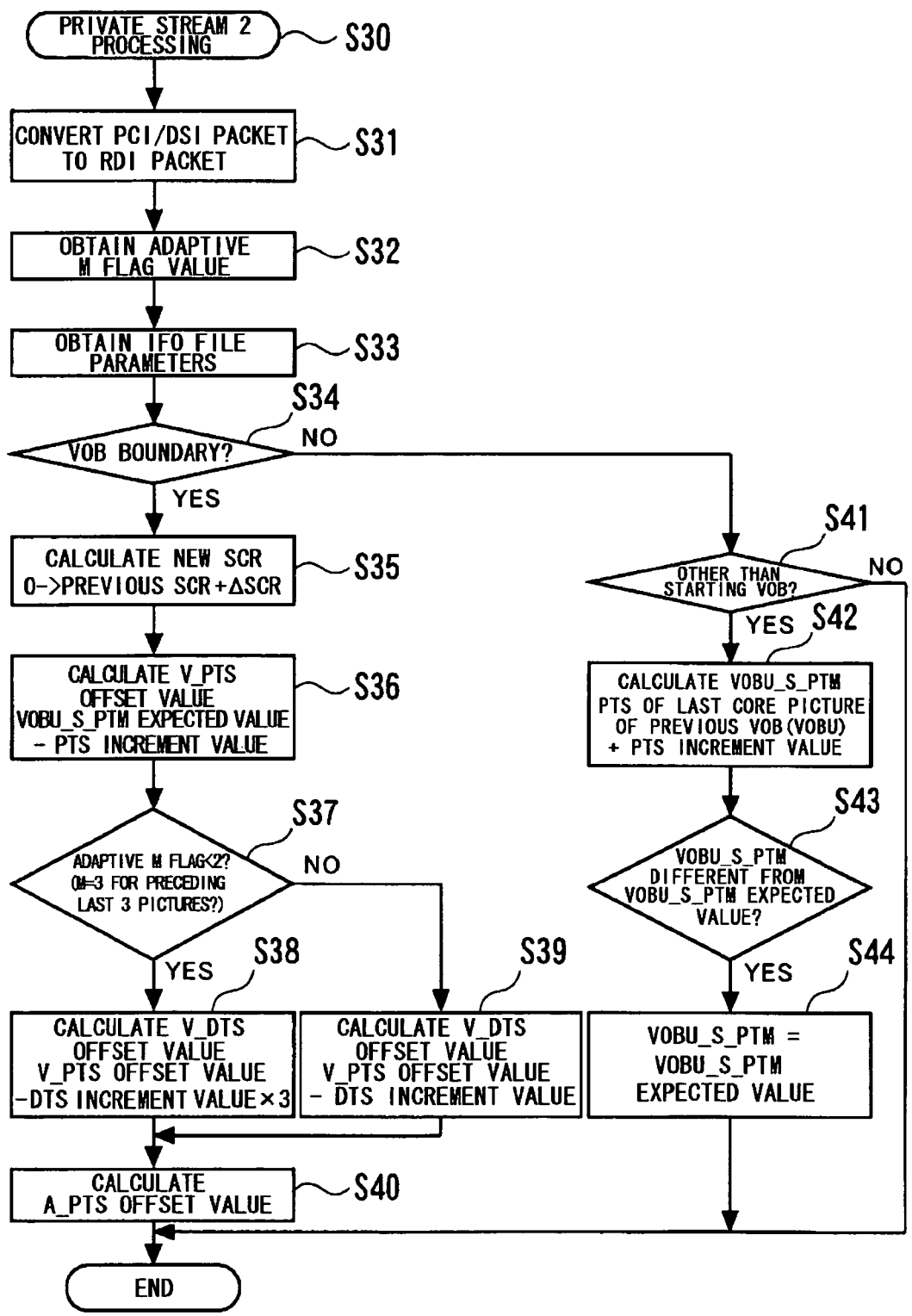
FIG. 9 is a flowchart showing the private stream 2 processing in the embodiment of the present invention.

FIG. 9 is a flowchart showing the detail of the private stream 2 processing (step S30) in FIG. 8. With reference to FIG. 9, the following describes the private stream 2 processing.

The PCI (Presentation Control Information)/DSI (Data Search Information) packet of the NV_PCK in the DVD-Video is converted to the RDI packet in the DVD-VR (step S31). Each of the PCI and DSI of the NV_PCK begins with the private stream 2 header. The PCI contains playback display control information, and the DSI contains access control information.

Next, the adaptive M flag of the NV_PCK is obtained (step S32).

Next, the parameters for the IFO file are obtained. That is, information or file data for playing back and managing the DVD-VR stream is obtained (step S33).

Next, whether the pack is on a VOB boundary is checked (step S34). In this embodiment, the VOB boundary can be detected because the VOBU_VOB_IDN value of the DSI_GI in the NV_PCK is incremented and the cell is updated. At this time, the SCR is reset in the DVD-Video.

When the pack is on a VOB boundary, the new SCR is calculated (step S35). ΔSCR is added to the previous SCR.

Next, the V_PTS offset value is calculated according to the expression (3) given above (step S36).

If the adaptive M flag is less than 2 (M=3 for preceding last 3 pictures), the V_DTS offset value is calculated according to the If the adaptive M flag is less than 2, as shown in Step S37 (M=3 for preceding last 3 pictures), the $V_{13}$ DTS offset value is calculated according to the expression (4) given above (step S38).

If the adaptive M flag is equal to or greater than 2, the V_DTS offset value is calculated according to the expression (5) given above (step S39).

Next, the A_PTS offset value is calculated (step S40).

On the other hand, if the pack is not on a VOB boundary (NO in step S34) in step S34, whether the pack is in a VOB other than the starting VOB is checked (step S41). If it is, the VOBU_S_PTM is calculated (step S42). This is calculated by adding ΔPTS (PTS increment value) to the PTS of the last core picture of the preceding VOB (VOBU).

If the VOBU_S_PTM is different from the VOBU_S_PTM expected value (predicted value) (YES in step S43), the VOBU_S_PTM is set to the VOBU_S_PTM expected value (step S44).

Whether the pack is in a VOB other than the starting VOB is not satisfied (NO in step S41), the processing is terminated.

Figure 4:
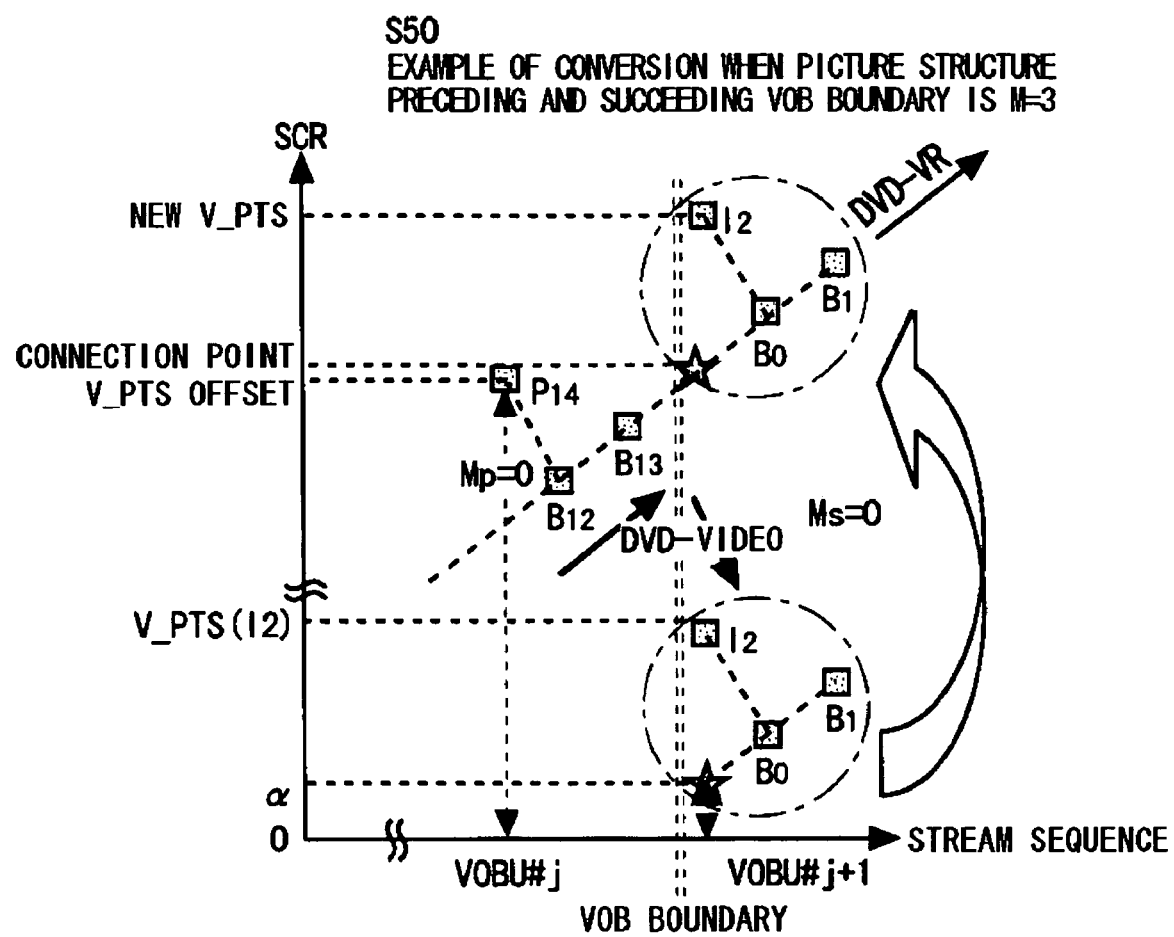
FIG. 4 is a diagram showing the control operation of the embodiment of the present invention.
Figure 5:
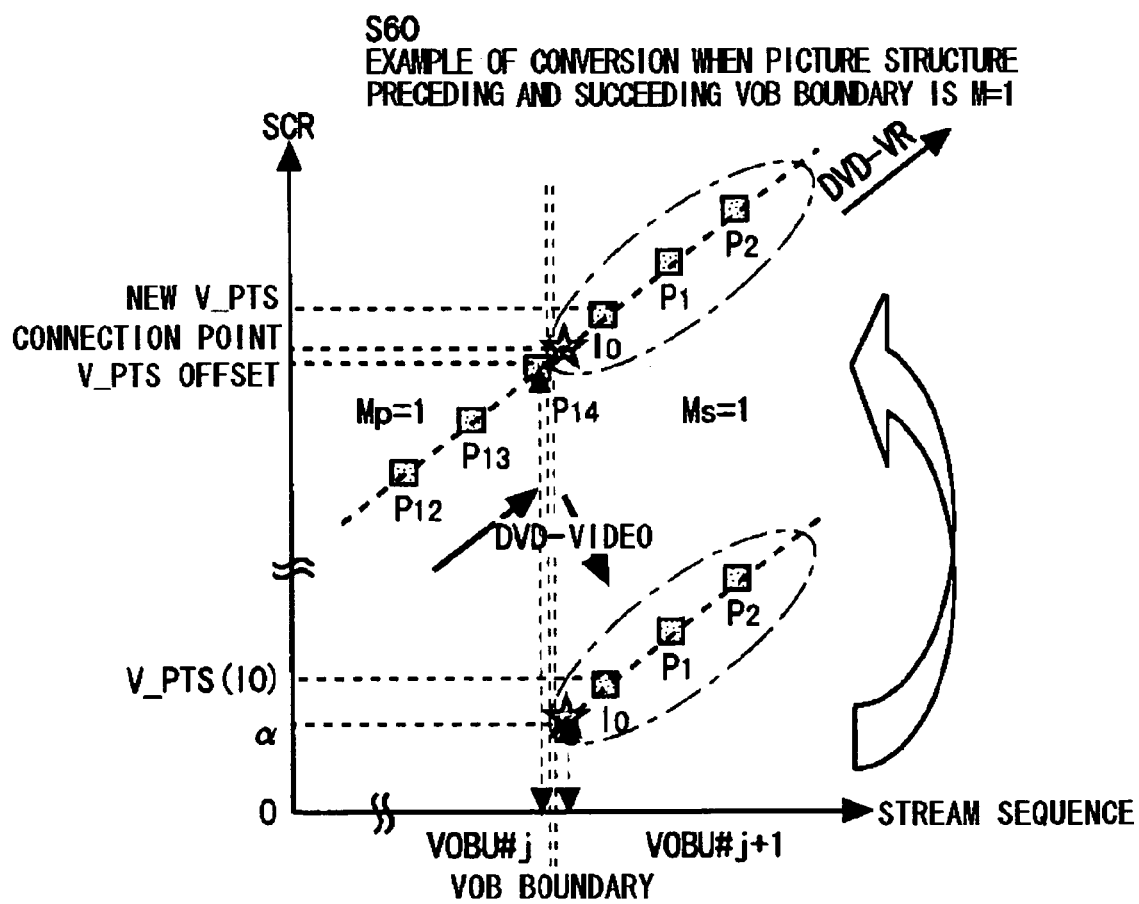
FIG. 5 is a diagram showing the control operation of the embodiment of the present invention.
Figure 6:
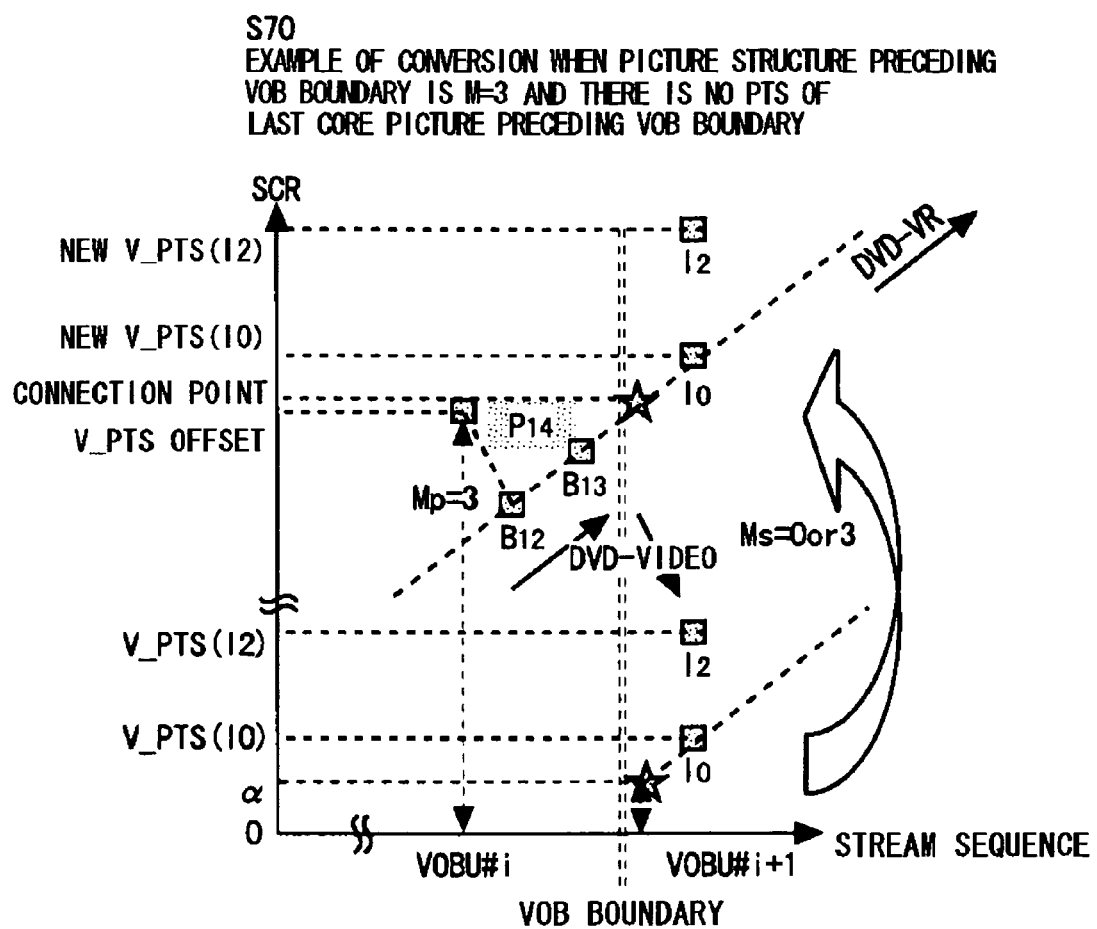
FIG. 6 is a diagram showing the control operation of the embodiment of the present invention.

FIG. 4, FIG. 5, and FIG. 6 are diagrams showing the conversion processing executed on a DVD-Video cell boundary for the V_PTS and the V_DTS to be recorded in the DVD-VR.

S50 in FIG. 4 (M=3 for the picture structure of both the preceding and succeeding pictures of the VOB boundary) is a diagram showing an example of the stream indicated by the numeral 100 in FIG. 1. By calculating the PTS of the core picture (I2) in the VOBU#j+1 immediately after the VOB boundary as well as the PTS offset value α, the I2, B0, and B1 frames in the DVD-Video (the SCR is discontinuous as shown by the broken arrow line in the DVD-Video in the figure) are converted to the frames to be recorded in the DVD-VR as shown by the hollow arrow.

S60 in FIG. 5 (M=1 for the picture structure for both the preceding and succeeding pictures of the VOB boundary) is a diagram showing an example of the stream indicated by the numeral 102 in FIG. 1. By finding the core picture offset value α for the frames I0, P1, and P2 in VOBU#j+1 and calculating the new PTS, the frames are converted so that the SCR rate becomes constant in the DVD-VR (see the hollow arrow in the figure).

In MPEG encoding, the coding amount of one picture is sometimes smaller than the V_PCK elementary data area. In this case, the V_PTS of the last core picture of a cell is sometimes not in the stream as shown in S70 in FIG. 6.

In this case, because the V_PTS of the last core picture of the cell cannot be used for calculating the VOBU_S_PTM and the V_PTS and V_DTS offset values, the adaptive M flag (Mp, Ms) is necessary. Note that the adaptive M flag (Mp, Ms) may be set in any position in an NV_PCK.

Figure 10:
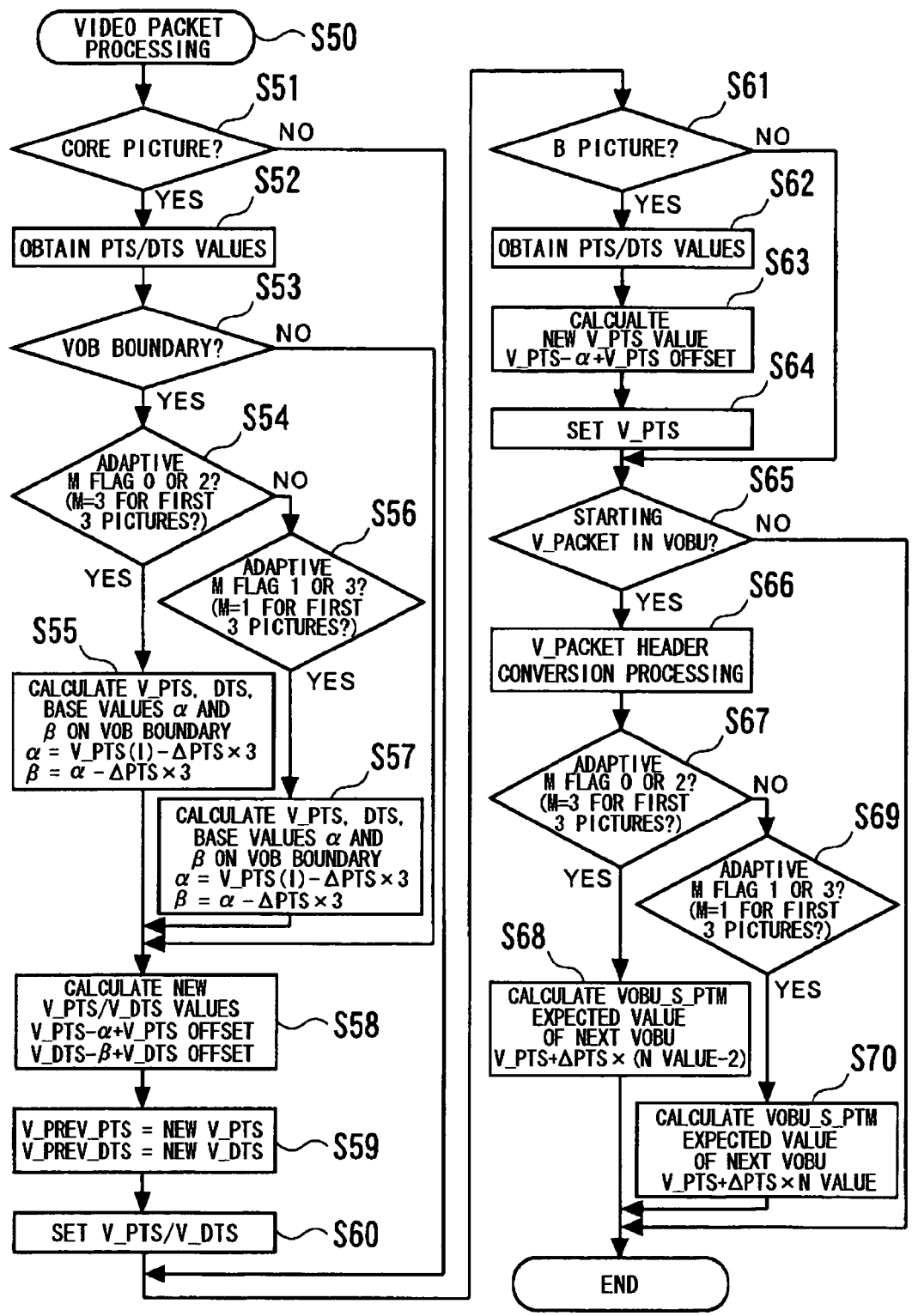
FIG. 10 is a flowchart showing video packet processing in the embodiment of the present invention.

FIG. 10 is a diagram showing the processing flow described with reference to FIG. 4 and is a flowchart showing video packet processing in this embodiment. The figure shows the processing for converting the V_PTS and V_DTS on a cell boundary in a DVD-Video that will be recorded in a DVD-VR.

If the frame to be processed is a core picture (I picture, P picture) (step S51), the PTS/DTS values are obtained (step S52).

If the frame is on a VOB boundary (YES in step S53), whether the adaptive M flag in the NV_PCK is 0 or 2 is checked (step S54). If the adaptive M flag is 0 or 2, the V_PTS, V_DTS, and base values α and β on the VOB boundary are calculated according to the expressions (6) and (8) described above (step S55).

$\alpha = V\_PTS(I) - \Delta PTS \times 3$ $\beta = \alpha - \Delta PTS \times 3$ On the other hand, if the adaptive M flag is 1 or 3 (YES in step S56), the V_PTS, V_DTS, and base values α and β on the VOB boundary are calculated (step S57).

$\alpha = V\_PTS(I) - \Delta PTS \times 3$ $\beta = \alpha - \Delta PTS \times 3$ The new V_PTS/DTS values are calculated according to the expressions (10) and (11) given above (step S58).

New $V\_PTS = V\_PTS - \alpha + V\_PTS$ offset

New $V\_DTS = V\_DTS - \beta + V\_DTS$ offset

Next, the new PTS/DTS are set in the previous PTS/DTS values (variables) (step S59).

$V\_Prev\_PTS = $ New $V\_PTS$ $V\_Prev\_DTS = $ New $V\_DTS$

Next, the V_PTS/V_DTS are set (set in the DVD-VR side) (step S60).

If the frame to be processed is not a core picture (that is, the frame is a B picture) (YES is step S61), the PTS/DTS values are obtained (step S62).

Next, the new V_PTS value is calculated according to the expression given below (step S63).

New $V\_PTS = V\_PTS - \alpha + V\_PTS$ offset

Next, the V_PTS is set (step S64).

If a video packet is at the start of the VOBU (YES in step S65), V_Packet_Header conversion is performed (step S66). That is, the header is converted from the DVD-Video format to the DVD-VR format.

If the adaptive M flag of the NV_PCK in the VOBU is 0 or 2 (YES in step S67), the VOBU_S_PTM expected value of the next VOBU is calculated according to the following expression (step S68).

$V\_PTS + \Delta PTS \times (N \text{ value} - 2)$

If the adaptive M flag is 1 or 3 (YES in step S69), the VOBU_S_PTM expected value of the next VOBU is calculated according to the following expression (step S70).

$V\_PTS + \Delta PTS \times N$ value

To calculate the base values α and β of the V_PTS and V_DTS in the starting V_PCK(I) (I is an I picture) immediately after the cell boundary, the adaptive M flag is required.

In the present embodiment, the A_PTS of the DVD-VR format stream is calculated for the audio on a frame cell boundary in the DVD-Video format stream, and recorded in the DVD-VR format stream.

The A_PTS immediately after the cell boundary is calculated from the two A_PTSs immediately preceding the cell boundary and the Number_of_frame_headers value of the A_PCK that is the second A_PCK before the cell boundary.

Figure 11:
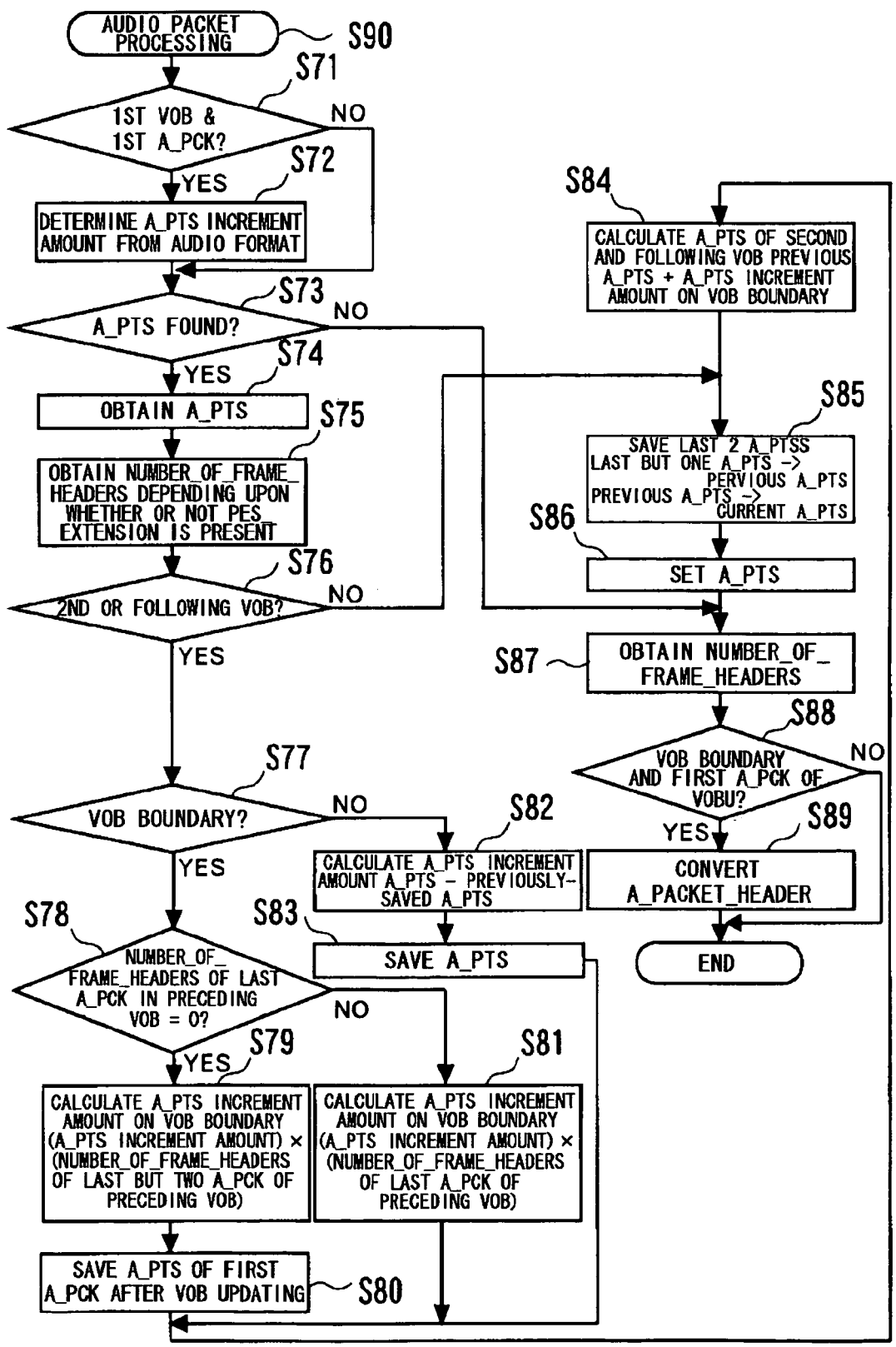
FIG. 11 is a flowchart showing audio packet processing in the embodiment of the present invention.

By executing this calculation, the audio is also converted, one pack at a time. FIG. 11 shows the processing flow.

If the packet is the first A_PCK included in the first VOB in the DVD-Video (YES in step S71), the A_PTS increment value is determined from the audio format (step S72).

If the A_PTS is found (YES in step S73), the A_PTS is obtained (step S74). On the other hand, if the A_PTS is not found, control is passed to step S87.

The Number_of_frame_headers (No. of frame headers) is obtained depending upon whether or not the PES (Packetized Elementary Stream)_extension is present (step S75).

If the packet is in the second or any of the following VOBs (YES in step S76) and is on a VOB boundary (YES in step S77) and if the Number_of_frame_headers of the last A_PCK in the preceding VOB is 0 (YES in step S78), the increment amount of the A_PTS on the VOB boundary is calculated using the following expression (step S79).

(Increment amount of A_PTS)×(Number_of_frame_headers of last but two A_PCK of preceding VOB)

The A_PTS of the first A_PCK after VOB updating is saved (step S80).

On the other hand, if the Number_of_frame_headers of the last A_PCK in the preceding VOB is not 0 (NO in step S78), the increment amount of the A_PTS on the VOB boundary is calculated using the following expression (Step S81).

(Increment amount of A_PTS)×(Number_of_frame_headers of last A_PCK of preceding VOB)

If the packet is not on a VOB boundary (NO in step S77), the A_PTS increment value is calculated according to the expression given below (step S82).

$A\_PTS$ increment amount $= A\_PTS - $ previously-saved $A\_PTS$

Next, the A_PTS is saved (set in DVD-VR) (step S83).

The A_PTS of the second and the following VOB is calculated by the expression "previous A_PTS+A_PTS increment amount on the VOB boundary" (step S84).

The last two A_PTSs are saved (step S85). That is, the last but one A_PTS is stored in the pervious A_PTS, and the previous A_PTS is saved in the current A_PTS.

Next, the A_PTS is set (step S86).

Next, the Number_of_frame_headers (number of frame headers) is obtained (step S87).

If the packet is on a VOB boundary and is the starting A_PCK of the VOBU, the A_PACKET_Header (audio packet header) conversion processing is executed (conversion from DVD-Video to DVD-VR) (step S89). As described before, control is passed to step 87 if the A_PTS is not found in step S73.

The following describes the operation and the effect of this embodiment. In this embodiment, the VOBU_S_PTM of the next VOBU in the DVD-VR is calculated from the Ms value of the adaptive M flag and the V_PTS(I) in the DVD-Video as shown in S10 in FIG. 3.

In addition, on a cell boundary, the V_PTS offset value, which is the V_PTS value to the cell boundary in the DVD-Video, is calculated from the VOBU_S_PTM value, V_PTS value, and V_PTS increment value (fixed value) of the DVD-Video as shown in S20, and the V_DTS offset value is calculated from the Mp of the adaptive M flag.

As shown in S30 in FIG. 3, the base values α and β of the V_PTS and V_DTS are calculated from the Ms value of the adaptive M flag and the starting V_PTS of the DVD-Video.

The new V_PTS and V_DTS to be recorded in the DVD-VR are calculated from the V_PTS, V_DTS, α, β, V_PTS offset, and V_DTS offset of the DVD-Video.

Figure 12:
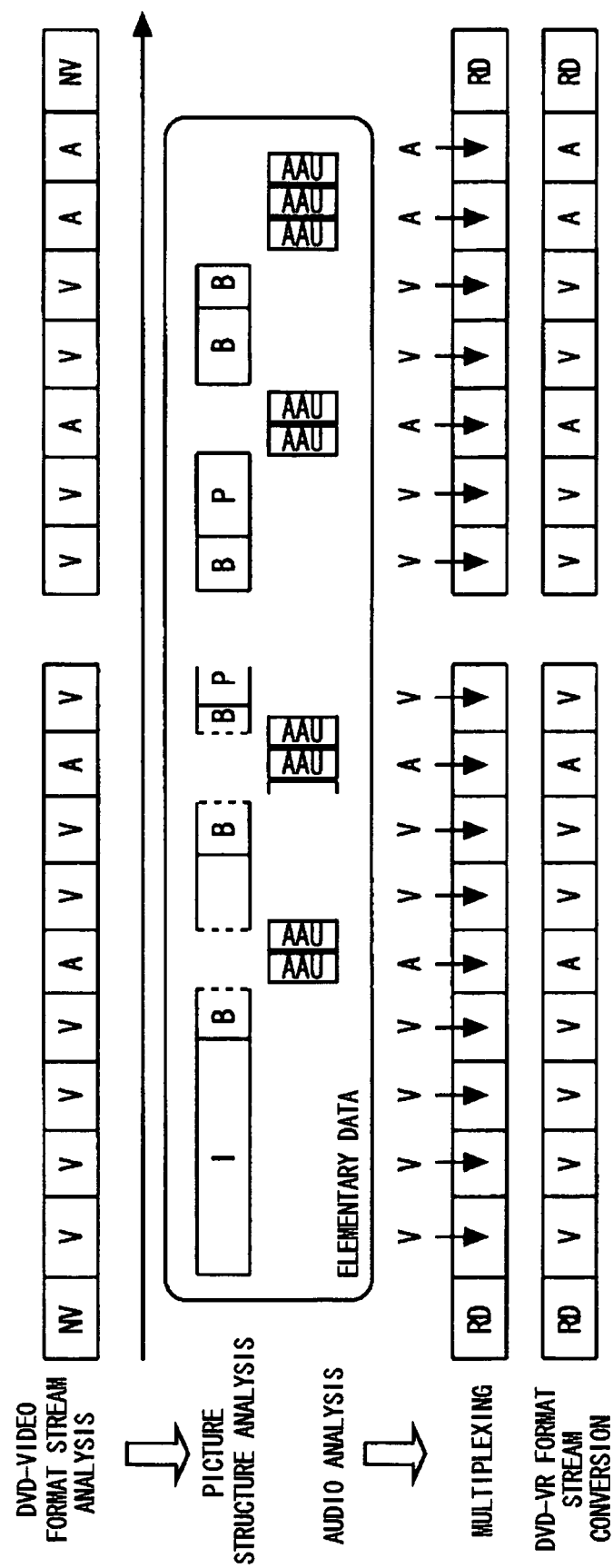
FIG. 12 is a diagram showing a data stream for describing the conventional control method.

As described above, this embodiment eliminates the need for elementary data analysis and re-multiplexing that are required in the method described with reference to FIG. 12. That is, this embodiment processes a DVD-Video serially from the start, making it possible to convert the stream speedily.

This embodiment executes conversion processing with emphasis only on a cell boundary to reduce the calculation amount and the processing time.

The position of a cell boundary is not known until processing is executed to the VOBU on the cell boundary.

Therefore, as shown in S10 in FIG. 3, the VOBU_S_PTM of the next VOBU in the DVD-VR is calculated in advance from the Ms value of the adaptive M flag and V_PTS(I) in the DVD-Video, and the calculated value is recorded when the next VOBU is on a cell boundary.

Although the variation is limited to the range from M=3 and M=1 in the above embodiment, the M value can be varied between any M value and M=1.

To calculate the VOBU_S_PTM after the processing is completed to a cell boundary, the information obtained from the processing S20, S30, and S40 in FIG. 3 is necessary.

The VOBU_S_PTM is in an RDI_PCK and an NV_PCK, while the V_PTS and V_DTS are in a V_PCK.

In a stream, an RDI_PCK and an NV_PCK, each of which is at the start of a VOBU, is followed by one or more V_PCKs.

This embodiment, in which a stream is processed serially, is not applicable to the processing of an RDI_PCK and an NV_PCK after processing V_PCKs. Therefore, in this embodiment, the VOBU_S_PTM must be calculated in advance.

In this embodiment, the adaptive M flag detected on a cell boundary in a DVD-Video format stream indicates the structure of preceding and succeeding pictures. Therefore, this embodiment eliminates the need for the analysis of video and audio elementary data and allows packs to be sequentially searched for. At the same time, this embodiment calculates the necessary time information for use in conversion, one pack at a time.

Figure 13:
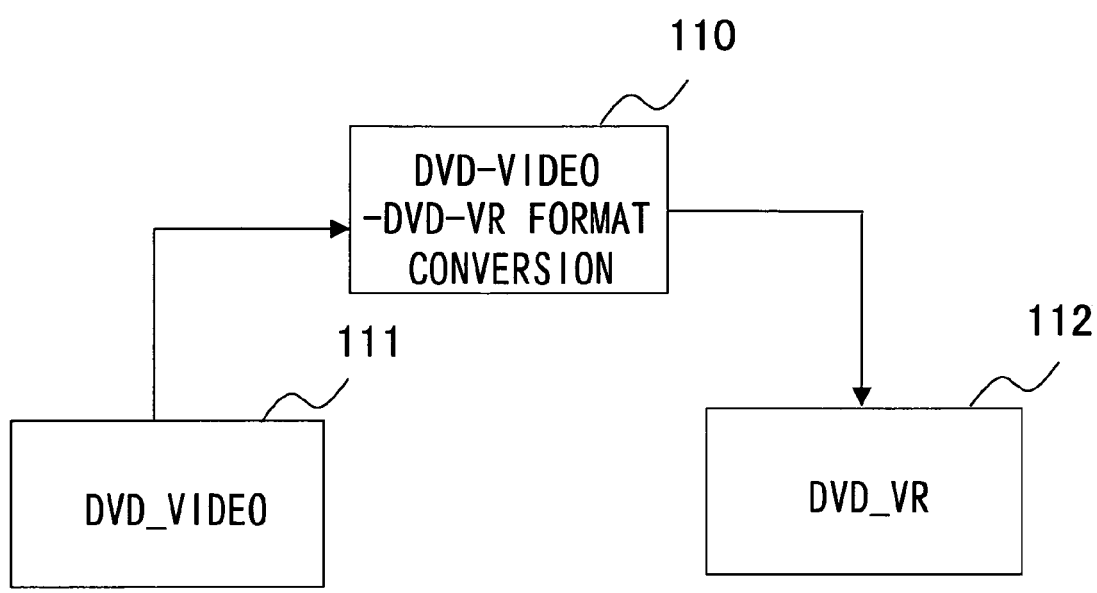
FIG. 13 is a diagram showing the configuration of a format conversion apparatus in the embodiment of the present invention.

Next, the device configuration of one embodiment of the present invention will be described. FIG. 13 is a diagram showing the configuration of a format conversion apparatus in one embodiment of the present invention. A format conversion apparatus 110 reads a DVD-Video format stream from a storage device 111, performs format conversion processing described with reference to FIG. 11 to FIG. 11, and writes a DVD-VR format stream in a storage device 112. The device in which the DVD-VR format stream is written may be an optical disc or a hard disk drive (HDD). The format conversion apparatus 110 may be implemented as a computer that executes operation under program control. In this case, the processing procedures shown in FIG. 7 to FIG. 11 are programmed, and a binary program in an executable format is executed on the computer for implementing the present invention.

FIG. 14 is a diagram showing the configuration of a format conversion dubbing device in one embodiment of the present invention. The format conversion dubbing device performs dubbing while converting a DVD-Video format stream to a DVD-VR format stream. A DVD-Video system encoder 13 receives video signals (Video) and audio signals (Audio), encodes them, and writes a DVD-Video format stream, for example, on an optical disk drive 12 such as a DVD-R or a DVD-RW. At this time, the DVD-Video system encoder 13 inserts an adaptive M flag in an NV_PCK. A DVD-VR system encoder 14 receives video signals (Video) and audio signals (Audio), encodes them, and writes a DVD-VR format stream, for example, on a hard disk drive (HDD) 11. A DVD decoder 17 decodes and plays back the DVD-Video or DVD-VR format stream, stored on the hard disk drive (HDD) 11 or optical disk drive 12, and outputs it on an output device (not shown). A data transfer processing unit 15 performs switching control of the data transfer between the hard disk drive (HDD) 11 and the optical disk drive 12 and between the encoder 13 or 14, the decoder 17, and a format conversion unit 10 in response to an instruction from a control device 16. The control device 16, configured by the CPU, controls the whole operation. A memory 18 is used by the control device 16 to store work data. It is also possible for the control device 16 to have the function to edit the DVD-Video format stream and to output the edited result in the DVD-VR format on the HDD 11.

When a DVD-Video is dubbed to a DVD-VR, the DVD-Video format stream is read from the optical disk drive 12. The encoder 13 inserts an adaptive M flag (Mp, Ms) into the starting pack (NV_PCK) of a VOBU in the DVD-Video format stream and stores the stream in a storage unit such as the hard disk drive 11. In response to the DVD-Video system format stream, in which the adaptive M flag (Mp, Ms) is inserted, the DVD-Video->VR format conversion unit 10 performs the format conversion processing described with reference to FIG. 1 to FIG. 11 and writes the converted DVD-VR format stream (see 103 in FIG. 1) on the optical disk drive 12 or the hard disk drive 11. The steps described above perform the format conversion and the dubbing processing.

While the present invention has been described using the embodiment described above, it is to be understood that the present invention is not limited to the configuration of the embodiment. It will be obvious that the present invention includes various changes and modifications that could be made by those skilled in the art within the scope of the present invention.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A format conversion method for converting a first DVD format stream, which includes a plurality of cells each including a plurality of video object units (VOBU) and is used primarily for playback, to a second DVD format stream which has no cell structure and is used for recording, said format conversion method comprising:
   a first step of inserting a flag into a starting pack of a VOBU in said first DVD format stream, said flag indicating a picture emergence pattern of a predetermined number of pictures preceding and succeeding said pack; and
   a second step of obtaining the picture emergence pattern of a VOBU, which precedes and succeeds a cell boundary, from said flag information included in said first DVD format stream for calculating time information on said second DVD format stream from time information on said first DVD format stream.

2. The format conversion method according to claim 1, wherein
   said first step comprises inserting the flag into a navigation pack (NV_PCK) in a VOBU in a DVD-Video format stream, said flag indicating an M value preceding and succeeding said VOBU, said M value corresponding to an interval between core pictures; and
   said second step comprises obtaining said picture emergence pattern of VOBUs preceding and succeeding a cell boundary in the DVD-Video format stream for calculating time information on a DVD-VR format stream from time information on the DVD-Video format stream.

3. The format conversion method according to claim 2, wherein said second step comprise calculating a playback start time (VOBU_S_PTM) of a next VOBU in the DVD-VR from a second M value (Ms) of said flag in said navigation pack in the DVD-Video format stream and a presentation timestamp (V_PTS) of a video pack in the DVD-Video.

4. The format conversion method according to claim 2, wherein said second step comprises:
   on a video object (VOB) boundary, calculating a V_PTS offset value, which is a V_PTS value to the VOB boundary in the DVD-Video, from a playback start time (VOBU_S_PTM) value of the VOBU in the DVD-Video, a presentation timestamp (V_PTS) value of a video pack, and an increment value of the presentation timestamp (V_PTS); and
   calculating a decoding timestamp (V_DTS) offset value of the video pack from a first M value (Mp) of said flag.

5. The format conversion method according to claim 2, wherein said second step comprises:
   calculating base values $\alpha$ and $\beta$ of a presentation timestamp (V_PTS) and a decoding timestamp (V_DTS) of a video pack from an Ms value, which is a second M value of said flag, and a starting V_PTS in the DVD-Video; and
   calculating new V_PTS and V_DTS to be recorded in the DVD-VR from the V_PTS V_DTS, $\alpha$, $\beta$, V_PTS offset value, and V_DTS offset value of the DVD-Video.

6. The format conversion method according to claim 1, wherein
   said first step comprises inserting the flag into a navigation pack (NV_PCK) of said VOBU in a DVD-Video format stream and storing the DVD-Video format stream, in which said flag is inserted, into a storage unit, said flag used for determining an M value (Mp, Ms) that is an interval between core pictures preceding and succeeding said VOBU; and wherein
   said second step comprises:
      obtaining said DVD-Video format stream, which contains the navigation pack in which said flag is inserted, from said storage unit and, according to the M value (Mp, Ms) preceding and succeeding a VOBU included in said flag in the navigation pack (NV_PCK) of a VOBU included in said DVD-Video,
      detecting a playback start time (VOBU_S_PTM) in each pack of the DVD-Video format stream,
      a presentation timestamp (V_PTS) of a video pack, and a decoding timestamp (V_DTS) of the video pack and, at the same time,
      finding a playback start time (VOBU_S_PTM) value of a next VOBU,
      V_PTS and V_DTS offset values on a VOB boundary, and
      base values $\alpha$ and $\beta$ of the V_PTS and the V_DTS after the VOB boundary; and
      calculating new V_PTS and V_DTS values for a DVD-VR format stream based on the V_PTS and V_DTS the V_PTS and V_DTS offset values on a VOB boundary, and the base values $\alpha$ and $\beta$ of a V_PTS and a V_DTS after the VOB boundary and recording the calculated values as information on the DVD-VR format stream.

7. The format conversion method according to claim 2, wherein, when pack processing is performed, said second step comprises:
   obtaining a system clock reference (SCR) if a pack is a starting pack and calculating an increment of said SCR if the pack is a starting pack of a stream to be processed; and
   performing navigation pack processing, video pack processing, or audio pack processing.

8. The format conversion method according to claim 7, wherein, when said navigation pack processing (Private Stream 2 processing) is performed and if the pack is on a VOB boundary, said format conversion method further comprises the steps of:
   calculating a new system clock reference (SCR);
   calculating a presentation timestamp (V_PTS) offset value of a video pack; and
   calculating a decoding timestamp (V_DTS) offset value based on the M value in said flag.

9. The format conversion method according to claim 7, wherein, when said video pack processing is performed and if a frame to be processed is a core picture, said format conversion method further comprises the steps of:
   obtaining a presentation timestamp (PTS) and a decoding timestamp (DTS);
   calculating a base value $\alpha$ of the presentation timestamp of a video pack (V_PTS) and a base value $\beta$ of the decoding timestamp of the video pack (V_DTS) from the presentation timestamp and an increment ($\Delta$PTS)

thereof depending upon the M value of said flag if the pack is on a VOB boundary;

calculating a new presentation timestamp of the video pack (V_PTS) from a presentation timestamp of the video pack (V_PTS) offset value and the base value $\alpha$; and calculating a new decoding timestamp of the video pack (V_DTS) from a decoding timestamp of the video pack (V_DTS) offset value and the base value $\beta$.

10. The format conversion method according to claim 9, wherein, if the frame to be processed is not a core picture, said format conversion method further comprises the steps of:

obtaining the presentation timestamp (PTS) and the decoding timestamp (DTS);

calculating a new presentation timestamp of the video pack (V_PTS) from a presentation timestamp of the video pack (V_PTS) offset value and the base value $\alpha$; and if the video packet is a starting video packet of the VOBU, calculating a playback start time (VOBU_S_PTM) of a next VOBU according to the M value of said flag based on the presentation timestamp of the video pack (V_PTS), an increment ($\Delta$PTS) of the presentation timestamp, and a number of frames (N) of one group of pictures (GOP).

11. A format conversion apparatus including:

a unit for converting a first DVD format stream, which includes a plurality of cells each including a plurality of video object units (VOBU) and is used primarily for playback, to a second DVD format stream which has no cell structure and is used for recording, said format conversion apparatus further comprising:

a circuit that inserts a flag into a starting pack of a VOBU in said first DVD format stream and stores said first DVD format stream, in which said flag is inserted, into a storage unit, said flag indicating picture emergence pattern of a predetermined number of pictures preceding and succeeding said pack.

12. A format conversion apparatus for converting a first DVD format stream, which includes a plurality of cells each including a plurality of video object units (VOBU) and is used primarily for playback, to a second DVD format stream which has no cell structure and is used for recording, said format conversion apparatus comprising:

a circuit that reads said first DVD format stream including said VOBUs, each of which has a flag inserted into a starting pack thereof;

a circuit that obtains a picture structure of VOBUs preceding and succeeding a cell boundary as to said first DVD format stream from the flag; and calculates time information on said second DVD format stream from time information on said first DVD format stream, said flag indicating picture emergence pattern of a predetermined number of pictures preceding and succeeding said pack.

13. A format conversion apparatus for converting a first DVD format stream, which includes a plurality of cells each including a plurality of video object units (VOBU) and is used primarily for playback, to a second DVD format stream which has no cell structure and is used for recording, said format conversion apparatus comprising:

a circuit that inserts a flag into a starting pack of a VOBU of said first DVD format stream, said flag indicating picture emergence pattern of a predetermined number of pictures preceding and succeeding said pack; and a conversion unit that obtains the picture emergence pattern of VOBUs preceding and succeeding a cell boundary as to said first DVD format stream from said flag, and calculates time information on said second DVD format stream from time information on said first DVD format stream.

14. The format conversion apparatus according to claim 13, wherein said circuit that inserting the flag inserts the flag into a starting navigation pack (NV_PCK) in a video object unit (VOBU) in a DVD-Video format stream, said flag used for determining an M value that indicates an interval between core pictures preceding and succeeding said VOBU; and wherein said conversion unit obtains the picture structure of VOBUs preceding and succeeding a cell boundary in the DVD-Video format stream, whose each starting navigation pack (NV_PCK) has said flag inserted, and calculates time information on a DVD-VR format stream from time information on the DVD-Video format stream.

15. The format conversion apparatus according to claim 14, wherein said conversion unit calculates a playback start time (VOBU_S_PTM) of a next VOBU in the DVD-VR from a second M value (Ms) of said flag in said navigation pack in the DVD-Video format stream and a presentation timestamp (V_PTS) of a video pack in the DVD-Video.

16. The format conversion apparatus according to claim 14, wherein said conversion unit comprises:

a circuit that calculates, on a video object (VOB) boundary, a V_PTS offset value, which is a V_PTS value to a cell boundary (VOB boundary) in the DVD-Video, from a VOBU_S_PTM value in the DVD-Video, a presentation timestamp (V_PTS) value of a video pack, and an increment value of the V_PTS; and a circuit that calculates a decoding timestamp (V_DTS) offset value of the video pack from an MP that is a first M value of said flag.

17. The format conversion apparatus according to claim 14, wherein said conversion unit comprises:

a circuit that calculates base values $\alpha$ and $\beta$ of a V_PTS and a V_DTS from an Ms value, which is a second M value of said flag, and a starting V_PTS in the DVD-Video; and a circuit that calculates new V_PTS and V_DTS to be recorded in the DVD-VR from the V_PTS, V_DTS, $\alpha$, $\beta$, V_PTS offset value and V_DTS offset value of the DVD-Video.

18. The format conversion apparatus according to claim 14, wherein, when pack processing is performed, said conversion unit comprises a circuit that obtains a system clock reference (SCR) if a pack is a starting pack, and calculates an increment of said SCR if the pack is a starting pack of a stream to be processed, for performing navigation pack processing, video pack processing, or audio pack processing.

19. The format conversion apparatus according to claim 18, wherein, when said navigation pack processing (Private Stream 2 processing) is performed and if the pack is on a VOB boundary, said conversion unit further comprises:

a circuit that calculates a new system clock reference (SCR);

a circuit that calculates a presentation timestamp (V_PTS) offset value of a video pack; and circuit that calculates a decoding timestamp (V_DTS) offset value based on the M value in said flag.

20. The format conversion apparatus according to claim 18, wherein, when said video pack processing is performed and if a frame to be processed is a core picture, said format conversion apparatus further comprises:
   a circuit that obtains a presentation timestamp (PTS) and a decoding timestamp (DTS);
   a circuit that calculates a base value a of the presentation timestamp of a video pack (V_PTS) and a base value β of the decoding timestamp (V_DTS) from the presentation timestamp and an increment (ΔPTS) thereof depending upon the M value of said flag if the pack is on a VOB boundary;
   a circuit that calculates a new presentation timestamp of the video pack (V_PTS) from a presentation timestamp of the video pack (V_PTS) offset value and the base value α; and
   a circuit that calculates a new decoding timestamp of the video pack (V_DTS) from a decoding timestamp of the video pack (V_DTS) offset value and the base value β.

21. The format conversion apparatus according to claim 20, wherein, if the frame to be processed is not the core picture, said format conversion apparatus further comprises:
   a circuit that obtains the presentation timestamp (PTS) and the decoding timestamp (DTS);
   a circuit that calculates a new presentation timestamp of the video pack (V_PTS) from a presentation timestamp of the video pack (V_PTS) offset value and the base value α; and
   a circuit that calculates a playback start time (VOBU_S_PTM) of a next VOBU according to the M value of said flag based on the presentation timestamp of the video pack (V_PTS), the increment (ΔPTS) of the presentation timestamp, and a number of frames (N) of one group of pictures (GOP) if the video packet is a starting video packet of the VOBU.

22. A dubbing device comprising said format conversion apparatus according to claim 11, wherein said dubbing device reads a DVD-Video format stream, converts the stream, and dubs the converted stream into a DVD-VR format stream.

23. A computer readable medium storing a program for causing a computer, which constitutes a device for converting a DVD-Video format stream to a DVD-VR format stream, to execute:
   a process that inserts a flag into a starting navigation pack (NV_PCK) of a video object unit (VOBU) in said DVD-Video format stream, said flag used for determining an M value that indicates an interval between core pictures preceding and succeeding said VOBU; and
   a conversion process that determines a picture emergence pattern of VOBUs preceding and succeeding a cell boundary in said DVD-Video format stream based on said flag and calculate time information on the DVD-VR format stream from time information on said DVD-Video format stream.

24. The computer readable medium according to claim 23, wherein said conversion process calculates a playback start time (VOBU_S_PTM) of a next VOBU of the DVD-VR from an M value (Ms), which is a later time in said flag in said navigation pack of the DVD-Video format stream, and a presentation timestamp (V_PTS) of a video pack in the DVD-Video.

25. The computer readable medium according to claim 23, wherein said conversion process calculates, on a video object (VOB) boundary, a V_PTS offset value, which is a V_PTS value to a cell boundary in the DVD-Video, from a VOBU_S_PTM value in the DVD-Video, a presentation timestamp (V_PTS) value of a video pack, and an increment value of the V_PTS; and calculates a decoding timestamp (V_DTS) offset value of the video pack from an Mp that is a first M value of said flag.

26. The computer readable medium according to claim 23, wherein said conversion process calculates base values α and β of a V_PTS and a V_DTS from an Ms value, which is a later M value (Ms) of said flag, and a starting V_PTS in the DVD-Video; and calculates new V_PTS and V_DTS to be recorded in the DVD-VR from the V_PTS V_DTS, α, β, V_PTS offset value, and V_DTS offset value of the DVD-Video.

27. The computer readable medium according to claim 23, wherein, when said navigation pack (NV_PCK) processing (Private Stream 2 processing) is performed and if the pack is on a video object (VOB) boundary, said conversion process further:
   calculates a new system clock reference (SCR);
   calculates a presentation timestamp (V_PTS) offset value of a video pack; and
   calculates a decoding timestamp (V_DTS) offset value based on the M value in said flag.

28. The computer readable medium according to claim 23, wherein, when video pack processing is performed and if a frame to be processed is a core picture, said conversion process further:
   obtains a presentation timestamp (PTS) and a decoding timestamp (DTS);
   calculates a base value α of the presentation timestamp of a video pack (V_PTS) and a base value β of the decoding timestamp (V_DTS) from the presentation timestamp and an increment (ΔPTS) thereof depending upon the M value of said flag if the pack is on a VOB boundary;
   calculates a new presentation timestamp of the video pack (V_PTS) from a presentation timestamp of the video pack (V_PTS) offset value and the base value α; and
   calculates a new decoding timestamp (V_DTS) from a decoding timestamp of the video pack (V_DTS) offset value and the base value β.

29. The computer readable medium according to claim 28, wherein, when video pack processing is performed and if the frame to be processed is not a core picture, said conversion process further:
   obtains the presentation timestamp (PTS) and the decoding timestamp (DTS);
   calculates a new presentation timestamp of the video pack (V_PTS) from a presentation timestamp of the video pack (V_PTS) offset value and the base value α; and
   calculates a playback start time (VOBU_S_PTM) of a next VOBU according to the M value of said flag based on the presentation timestamp of the video pack (V_PTS), an increment (ΔPTS) of the presentation timestamp, and a number of frames (N) of one group of pictures (GOP) if the video packet is a starting video packet of the VOBU.

* * * * *